United States Patent [19]

Moberly

[11] 4,149,223

[45] Apr. 10, 1979

[54] TACKLE BOX LIGHT

[76] Inventor: Jack E. Moberly, R.R. 4, Box 536F, Anderson, Ind. 46011

[21] Appl. No.: 770,610

[22] Filed: Feb. 22, 1977

[51] Int. Cl.² ............................................ A45C 15/06
[52] U.S. Cl. .................................................. 362/156
[58] Field of Search ............................... 362/154–156, 362/187, 188

[56] References Cited

U.S. PATENT DOCUMENTS

| 2,517,914 | 8/1950 | Nowaczek | 362/155 |
| 2,751,489 | 6/1956 | Cole | 362/156 |
| 2,801,330 | 7/1957 | Gay | 362/156 |
| 3,231,730 | 1/1966 | Wagner | 362/154 |
| 3,404,267 | 10/1968 | Zucker | 362/156 |
| 3,938,132 | 2/1976 | Cunningham | 362/154 X |

Primary Examiner—R. L. Moses
Attorney, Agent, or Firm—Howard I. Podell

[57] ABSTRACT

A tackle box light can be mounted in an upper section of a three section extendible housing and can be operated by a set of batteries mounted in a chamber in the upper section of the housing to which the light is attached, a pivotally attached lens mounted to the top section of the housing permits transmission of the light down into the tackle box which is preferably of the hip roof type, the housing may be attached to the tackle box by a set of brackets one of which can be mounted to the bottom of the tackle box the other of which is adjustable attachable to the upper edge of the tackle box.

3 Claims, 4 Drawing Figures

TACKLE BOX LIGHT

I have invented a new and novel tackle box light. My device can be used on various types of tackle boxes including the flat roof tackle box and the hip roof type tackle box.

My invention can be understood in view of the accompanying figures.

Figure 1:
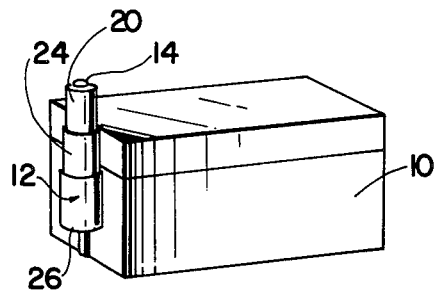
FIG. 1 is a perspective side view of the tackle box light attached to a tackle box.
Figure 3:
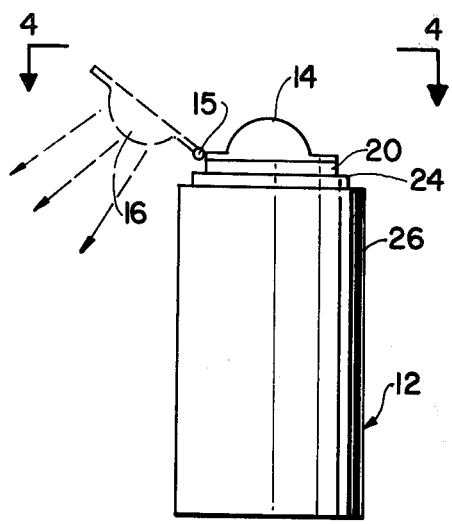
FIG. 3 is a close up front view of the tackle box light in the closed configuration.
Figure 2:
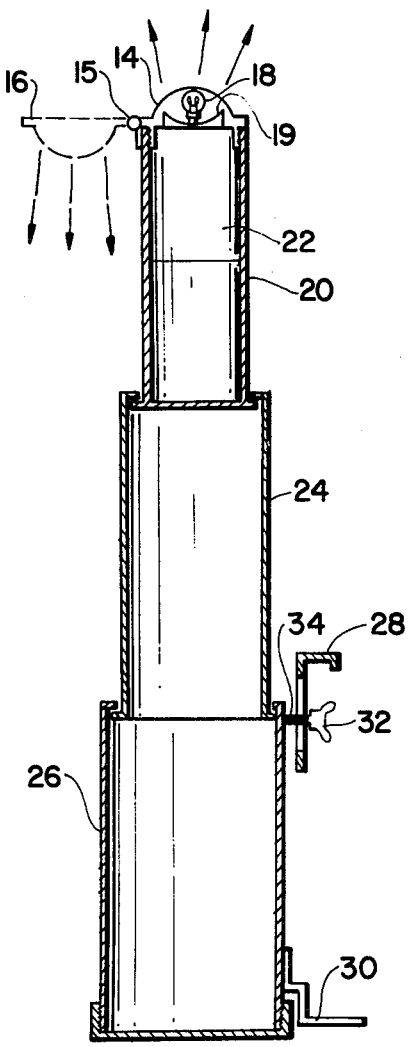
FIG. 2 is a close up side view of the tackle box light in the extended configuration.
Figure 4:
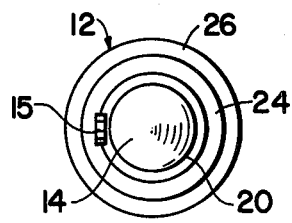
FIG. 4 is a top view of the tackle box light taken in the plane 4—4 of FIG. 3.

With regard to FIGS. 1, 2, 3, and 4, a tackle box 10 has mounted on its side a tackle box light 12 at the top of which a lens 14 is pivotably attached 15 so that the lens may be swung into the opened position 16 to transmit light in a downward direction into the tackle box. Inside the lens 14 a bulb 18 is mounted in a reflector 19 and the bulb 18 is connected to the upper section 20 of the housing 12. A set of dry cell batteries 22 are mounted in the upper section 20 and are electrically connected to the bulb 18 to activate the bulb 18 when needed. The upper section 20 can be extended upward through the middle section 24 which in turn can be extended through the bottom section 26 of the housing 12 so that the height of the bulb 18 can be adjusted for appropriate needs of the fisherman. In addition, when not necessary the sections can be collapsed into a compact unit. The lower section of the housing 26 can be attached by brackets 28 and 30 to the side of the tackle box 10 and a wing nut 32 can be tightened on a bolt 34 to secure the upper bracket 28 at the desired and necessary height for proper attachment to the particular tackle box 10.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. A tackle box light, comprising:
    a housing removably attachable to a side of said tackle box,
    the housing having a bottom section,
    a middle section telescopically mounted in the bottom section,
    an upper section telescopically mounted in the middle section,
    the upper section forming a chamber,
    a battery removably receiveable in the chamber, and
    a light attached to a top of the upper chamber and electrically connected to the battery.

2. The tackle box light of claim 1, further comprising: the light connected through a reflector to the battery.

3. The tackle box light of claim 2, wherein the light is a bulb.

* * * * *